(12) United States Patent
Aluvila (10) Patent No.: US 12,455,742 B2
(45) Date of Patent: Oct. 28, 2025

(54) INPUT DATA MANAGEMENT IN A DATA PROCESSING SYSTEM

(71) Applicant: Aptiv Technologies AG, Schaffhausen (CH)

(72) Inventor: Vinod Aluvila, Hildesheim (DE)

(73) Assignee: Aptiv Technologies AG, Schaffhausen (CH)

( * ) Notice: Subject to any disclaimer, the term of this patent is extended or adjusted under 35 U.S.C. 154(b) by 7 days.

(21) Appl. No.: 18/418,229

(22) Filed: Jan. 20, 2024

(65) Prior Publication Data

US 2024/0248715 A1 Jul. 25, 2024

(30) Foreign Application Priority Data

Jan. 23, 2023 (EP) .................................. 23152923

(51) Int. Cl.
*G06F 9/30* (2018.01)
*G06F 9/38* (2018.01)

(52) U.S. Cl.
CPC .......... *G06F 9/3004* (2013.01); *G06F 9/3867* (2013.01)

(58) Field of Classification Search
CPC ...... G06F 9/3004; G06F 9/3867; G06F 9/542; G06F 9/526; G06F 9/4881; G06F 9/44505; G06F 9/54
See application file for complete search history.

(56) References Cited

U.S. PATENT DOCUMENTS

| | | | |
|---|---|---|---|
| 6,370,625 B1 * | 4/2002 | Carmean | G06F 9/3004 711/155 |
| 7,761,670 B2 * | 7/2010 | Holt | G06F 9/526 711/E12.091 |
| 2008/0313649 A1 * | 12/2008 | Tian | H04N 1/00885 719/315 |
| 2017/0250903 A1 * | 8/2017 | Rasanen | H04L 47/20 |
| 2019/0043341 A1 * | 2/2019 | Wouhaybi | G16H 10/60 |
| 2019/0138368 A1 * | 5/2019 | Jereczek | G06F 9/542 |
| 2019/0378334 A1 * | 12/2019 | Simpkinson | G06V 20/20 |
| 2020/0396578 A1 * | 12/2020 | Hall | H04W 12/08 |

FOREIGN PATENT DOCUMENTS

EP   4120078 A1   1/2023

OTHER PUBLICATIONS

CN-112448992-A, "Edge Calculation Task Scheduling Method and Device" Mar. 5, 2021, Shi W, (Year: 2021).*

* cited by examiner

*Primary Examiner* — Farley Abad
(74) *Attorney, Agent, or Firm* — Miller Johnson (57) ABSTRACT

A method for input data management is implemented in a data processing system. The data processing system includes a memory with multiple memory locations configured to store sensor data obtained from a sensor system. The data processing system includes at least one service pipeline with multiple feature. services configured to process sensor data stored in the memory locations. The method includes determining registration of at least one feature service for processing sensor data stored in at least one of the memory locations. The method includes locking the at least one memory location to prevent overwriting of the sensor data stored in the at least one memory location. The method includes, upon determining completion of processing of the sensor data by the at least one feature service, unlocking the at least one memory location.

12 Claims, 9 Drawing Sheets

INPUT DATA MANAGEMENT IN A DATA PROCESSING SYSTEM

CROSS-REFERENCE TO RELATED APPLICATIONS

This application claims priority to EP 23 152 923 filed Jan. 23, 2023, the entire disclosure of which is incorporated by reference.

FIELD

The present methodologies relate to input data management in a data processing system. More specifically, they relate to input data management in a data processing system throughout one or more asynchronous environments like artificial intelligence or machine learning.

BACKGROUND

EP21185445.0 relates to a method for scheduling execution of feature services within a distributed data flow service (DDFS)-framework including a main system-on-chip, (SoC), with a standard core and accelerator cores. Sensing systems provides input data containing sensor data and feature services process the input data, wherein each feature services includes a common pattern with an algorithm for processing the input data. A feature for encapsulating the algorithm into a generic wrapper rendering the algorithm compatible with other algorithms, a feature interface for encapsulating a feature output into a generic interface allowing generic communication with other features.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present methodologies are generally directed to improve input data management in a data processing system. The main aspects are set out by the independent claims.

In this respect, according to a first aspect a method for input data management in a data processing system is provided. The method comprises, determining registration of at least one feature services for processing sensor data stored in at least one of the memory locations. The method further comprises, locking the at least one memory location to prevent overwriting of the sensor data stored in the at least one memory location. The method further comprises, upon determining completion of processing of the sensor data by the at least one feature services, unlocking the at least one memory location.

Further another aspect, an apparatus is provided comprising a memory with a plurality of memory locations configured to store sensor data obtained from a sensor system. The apparatus further comprises at least one service pipeline comprising a plurality of feature services configured to process sensor data stored in the memory locations.

Further refinements are set forth by the dependent claims.

These and other objects, embodiments and advantages will become readily apparent to those skilled in the art from the following detailed description of the embodiments having reference to the attached figures, the invention not being limited to any particular embodiments.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The aspects and examples of the present disclosure are described with reference to the following figures.

In the drawings, reference numbers may be reused to identify similar and/or identical elements.

DETAILED DESCRIPTION

The present disclosure relates to a data processing system, especially to a data processing system, in asynchronous environments like artificial intelligence or machine learning. An example use case of the present disclosure is a data processing in a vehicle in which input data is generated by one or more sensor or camera systems and processed by artificial intelligence or machine learning processes.

Figure 1:
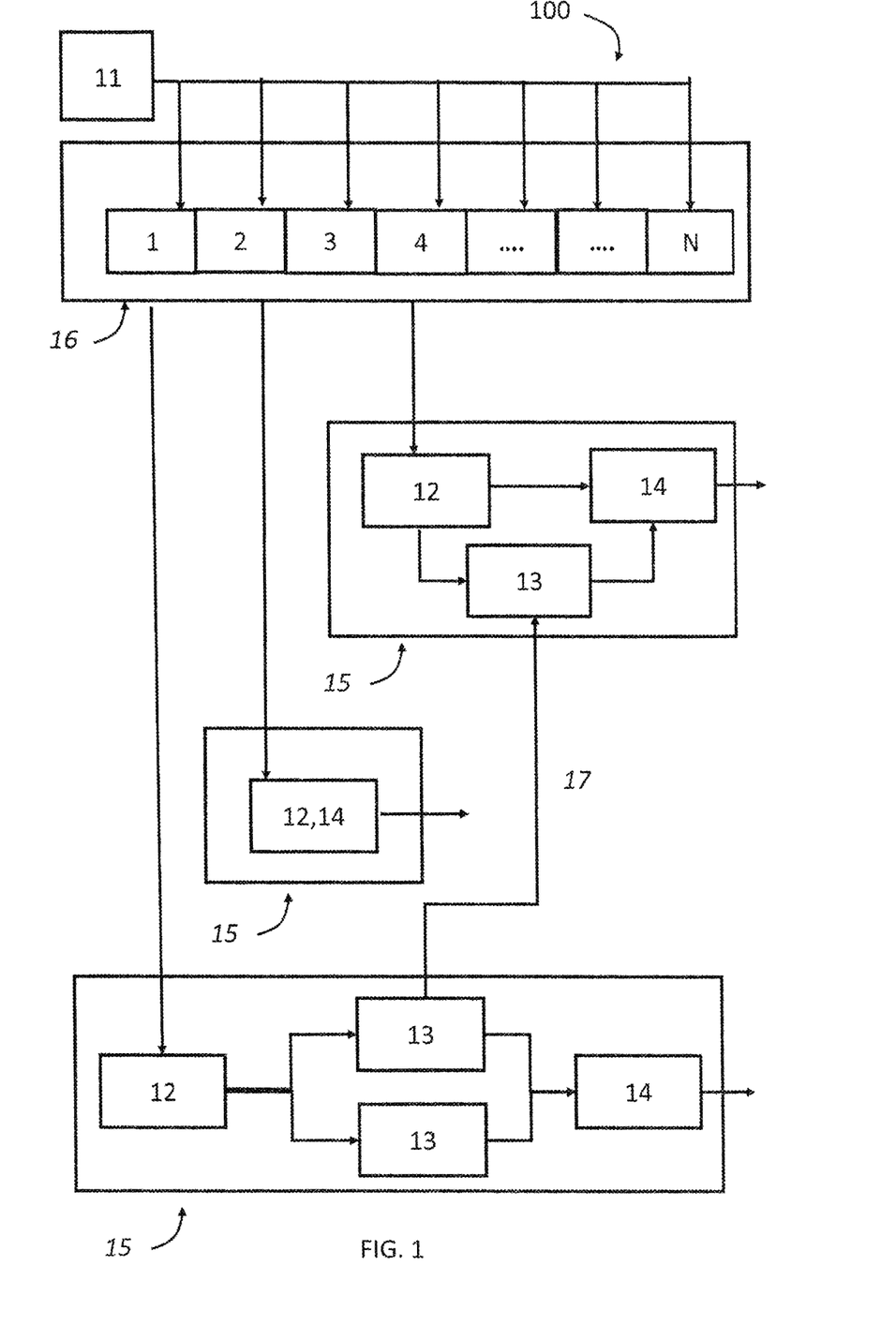
FIG. 1 shows a data processing system with a sensor system, a memory and a plurality of feature services.

FIG. 1 shows an input data processing system 100, wherein the data processing system 100 comprises a memory 16 comprising a plurality of memory locations, e.g. memory locations 1-, ..., N in a circular memory. A circular memory is a memory that uses a single, fixed size buffer as if it were connected end-to-end. The memory locations are configured to store sensor data obtained from a sensor system 11. In addition, the data processing system 100 comprises at least one service pipeline 15 which comprises a plurality of feature services 12, 13, 14. configured to process sensor data stored in the memory locations. The feature services 12, 13, 14 are configured to process sensor data stored in the memory locations of the memory 16 and provide outputs for further feature services 12, 13, 14 in the same service pipeline 15 or via cross dependencies 17 to feature services 12, 13, 14 of other service pipelines 15.

In some embodiments, a feature service 12, 13, 14 is designed to provide one or more features, e.g., each feature service is part of a seat occupancy detection or a vehicle exit assistance or any other related detection method. Feature services 12, 13, 14 are applied on sensor data received from various sensors systems, e.g., interior and exterior cameras, radars or any other detecting system. Feature services 12, 13, 14 provide results based on the sensor data for further processing. The feature services 12, 13, 14 provide either a final output or an intermediate output serving as input to another feature service 12, 13, 14, which further process these results and produces further outputs.

One or a plurality of connected feature services 12, 13, 14 are generally referred to as a service pipeline 15. A plurality of service pipelines 15 is able to run in parallel to each other in a data processing system 100, wherein each service pipeline 15 contains at least one feature service 12, 13, 14.

In some embodiments the memory 16 is a volatile memory, e.g., a random-access memory (RAM) in an embedded system. The memory 16 provides short access time to the sensor data stored in a plurality of memory locations. Furthermore, the memory 16 allows the data processing system 100 fast and parallel access to the memory locations from different feature services 12, 13, 14 belonging to different service pipelines 15. In some embodiments the different memory locations of the memory 16 have usually the same size for storing the sensor data, e.g., image or data frames. For example, if images from a camera are stored in the memory 16, those sensor data usually have the same data size.

In a practical use case, the number of memory locations of the memory 16 is suitable to allow sufficient free and unlocked memory locations for the particular storage frequency of the sensor system 11 and the amount of time used by the service pipelines 15 for process the sensor data stored at the memory locations of the memory 16. In other words, the memory size and the number of memory locations of the data processing system 100 is sufficiently dimensioned to avoid any deadlocks or processing interruptions due to the asynchronous character of data storage by the sensor system 11 and data processing by the service pipelines 15.

The sensor system 11, e.g., a camera, a radar or any other detecting system, of the data processing system 100 works asynchronously from the plurality of feature services 12, 13, 14 in the at least one service pipeline 15. The sensor system 11 provides sensor data typically at a high rate, e.g., the sensor system 11 provides sensor data with a rate of 90 data or image frames per second, also other frequencies for providing sensor data are possible.

The feature services 12, 13, 14 of the at least one service pipeline 15 read sensor data stored in the memory with a lower rate than the sensing service 11, e.g., the feature services 12 of the service pipelines 15 read with a rate of 10 data or image frames per second, also other frequencies for reading sensor data are possible, wherein the reading frequencies of the feature services 12, 13, 14 are lower than the frequencies for providing sensor data by the sensor system 11.

After providing sensor data, the sensor system 11 scans through the plurality of memory locations of the memory 16 for an unlocked memory location of the memory 16, e.g., an unlocked memory location is a memory location with no overwrite protection or contains an overwrite permission. After detecting an unlocked memory location of the memory 16 by the sensor system 11, the sensor data of the sensor system 11 such as a data frame or image are written to the unlocked memory location of the memory 16.

An information of the stored sensor data in an unlocked memory location is published to the plurality of feature services 12, 13, 14 of the at least one service pipeline 15. The information about the stored sensor data is received by the feature services 12, 13, 14 of the at least one pipeline 15.

In some embodiments the published information of the stored sensor data is a specific information regarding the sensor data, e.g., the information contains a timestamp, a geo-location, a data size or any other data specific information. In some embodiments the published information also contains the exact memory location of the sensor data, e.g., memory location 5, 42 or any other memory location in the memory 16.

In some embodiments the information is published via a journal (not shown) which is part of the data processing system 100 wherein all feature services 12, 13, 14 have access to the published information in the journal. In some embodiments the information is published directly via a signal to the plurality of feature services 12, 13, 14, which are part of the at least one service pipeline 16.

Based on the published information to the feature services 12, 13, 14 of the at least one pipeline 15 about the stored sensor data in a memory location, one or more of the feature services 12, 13, 14 either register the memory location with stored sensor data for processing or none of the feature services 12, 13, 14 of the at least one service pipeline 15 register the memory location with stored sensor data for processing.

The registration of a memory location is realized by a signal from the feature service 12, 13, 14 to the data processing system 100, e.g., the signal is sent to a controller or a memory controller of the data processing system (not shown), the controller resides either in the sensor system, in the memory or as a controller for several sensor systems outside of the data processing system. In some embodiments the signal of the registration contains information about the memory location of the registered sensor data. In some embodiments the signal of the registration contains the memory location of the registered sensor data and further specific information regarding the sensor data e.g., the information contains a timestamp, a geo-location, a data size or any other specific information regarding the sensor data.

In the latter case, if no feature service 12, 13, 14 of the at least one service pipeline 15 registers the memory location with stored sensor data for processing, the memory location of the memory 16 remains unlocked, e.g., for the memory location no write protection is set, the memory location contains a write permission. As a consequence, the sensor system 11 is still allowed to write further sensor data to the unlocked memory location of the memory 16.

In the former case, if at least one feature service 12, 13, 14 of the at least one service pipeline 15 registers the memory location with stored sensor data for processing, the memory location of the memory 16 is locked to prevent overwriting of the stored sensor data until the processing of the at least one service pipeline 15 is concluded. As a consequence, the sensor system 11 is not able to overwrite the locked memory location with further sensor data until the memory location of the memory 16 is unlocked by all feature services 12, 13, 14 of the at least one service pipeline 15. In this case, the sensor system 11 continues to search for another memory location of the memory 16 which is unlocked in order to store subsequent data or image frames. If two or more feature services 12, 13, 14 of the at least one service pipeline 15 register for processing the memory location with stored sensor data, then the memory location of the memory 16 is locked until all feature services 12, 13, 14 of the at least one service pipeline 15 unlocks the memory location of the memory 16.

The unlocking of a memory location, upon determining completion of processing of the stored sensor data, is realized by a signal from the feature service 12, 13, 14 to the data processing system 100, e.g., the signal is sent to a controller or a memory controller of the data processing system (not shown), the controller resides either in the sensor system 11, in the memory 16 or as a controller for several sensor systems outside of the data processing system 100. In some embodiments the signal for unlocking contains the information about the memory location of the registered sensor data and that the sensor data are processed by the corresponding service pipeline 15. In some embodiments the signal contains the memory location of the registered sensor data and further specific information regarding the sensor data e.g., the information contains a timestamp, a geo-location, a data size or any other specific information regarding the sensor data.

In addition, the feature service(s) 12, 13, 14 of the at least one service pipeline 15 provide the information about the selected sensor data to (possible) further feature services 12, 13, 14 in the corresponding service pipeline 15.

Figure 2:
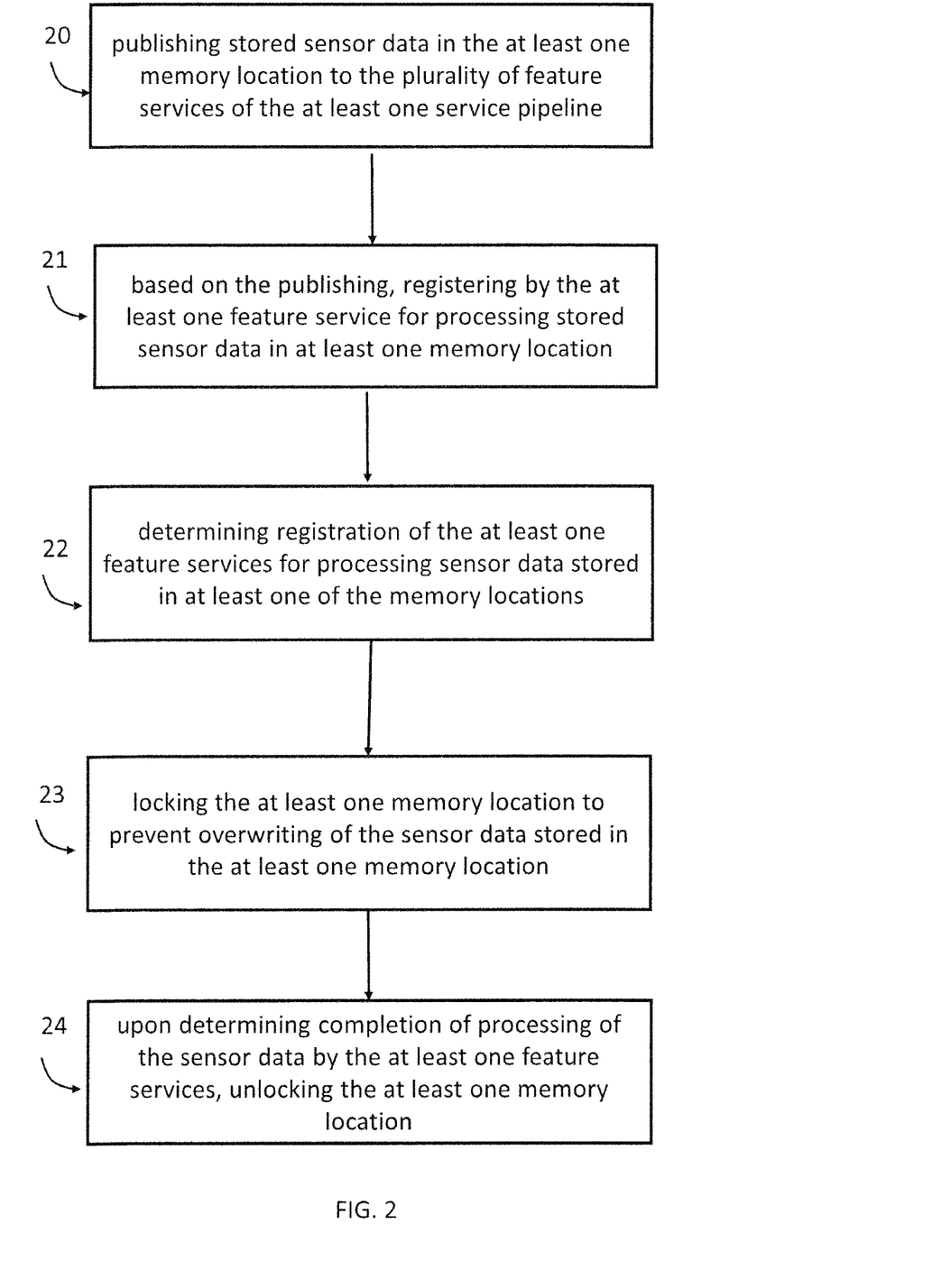
FIG. 2 shows a first sequence for input data management in a data processing system.

FIG. 2 shows schematically a method for input data management in a data processing system 100. In some embodiments, the controller determines that stored sensor data in the at least one memory location are published to the plurality of feature services 11, 12, 13 of the at least one service pipeline 15. The controller further determines that based on the publishing, the stored sensor data in at least one memory location are registered for processing by the at least one feature service 11, 12, 13.

In a further embodiment, the controller determines that a registration of the at least one feature services 12, 13, 14 is determined for processing sensor data stored in at least one of the memory locations. The controller further determines that the at least one memory location is locked to prevent overwriting of the sensor data stored in the at least one memory location. The controller further determines that upon determining completion of processing of the sensor data by the at least one feature services 12, 13, 14. the at least one memory location is unlocked.

Since the feature service 12, 13, 14 provides the information of the processed sensor data to all feature services 12, 13, 14 in the corresponding service pipeline 15, it is guaranteed that the same sensor data from one memory location of the memory 16 are processed by all feature service(s) of the corresponding service pipeline 15. It is also guaranteed that feature services 12, 13, 14 of several service pipelines 15 using sensor data from the same memory location process the same sensor data. A further advantage is that the sensor data are processed by the service pipelines 15 and their feature services directly in the memory locations of the memory 16. Thus, in the data processing system, no copies of sensor data need to be used. Therefore, efficient memory utilization is facilitated.

Furthermore, it is prevented that the at least one sensor system overwrites sensor data, e.g. image or date frames, that are in use. In addition, only sensor data which are registered as selected for processing remain stored in the memory locations of the memory 16 until processing of the feature services of the service pipelines 15 is concluded. The remaining memory locations can be used for storing further sensor data from the sensor system 11.

Furthermore, the overall requirement for storing sensor data is reduced. The input data management presented here achieves that no additional storage of sensor data is necessary and thus the required memory limits are kept at a minimum. In other words, the memory 15 is more efficiently used.

Referring back to FIG. 1 showing several service pipelines 15 with at least one feature service 12, 13, 14. In some embodiments the feature service 12, which is the feature service in the service pipeline 15 that first processes the sensor data is the master feature service 12. The feature service 14, which is the feature service in the service pipeline 15 that last processes the same sensor data is the final feature service 14 (e.g., slave and final feature service outputting the processing result of the overall service pipeline 15). A feature service 13 which is not a master or a final feature service is called a feature service 13 (e.g., slave feature service). The master feature service 12 informs all other feature services 13, 14 about the processed sensor data of the memory location and ensures that all feature service in the service pipeline process the same sensor data.

The master feature service 15 is the feature service that performs the tasks of monitoring the published details of the stored sensor data in the memory location and the registration for processing stored sensor data in the at least one memory location, i.e. it performs the communication with the environment outside of the service pipeline 15 (e.g., a controller or a memory controller of the data processing system (not shown), the controller resides either in the sensor system 11, in the memory 16 or as a controller for several sensor systems outside of the data processing system 100), as described above. In a further embodiment, the master feature service 15 mayreport the completion of processing of the stored sensor data in the memory location by the service pipeline 15 to the environment outside of the service pipeline 15, when the final feature service 14 informs the master feature service 15 about the completion of processing of the stored sensor data in the memory location by the service pipeline 15. In an alternative embodiment, the final feature service 14 reports the completion of processing of the stored sensor data in the memory location by the service pipeline 15 directly to the environment outside of the service pipeline 15.

In some embodiments the master feature service 12 receives the published information about stored sensor data in a memory location via a journal or via a signal as described above. The master feature service 12 either registers the stored sensor data in the memory location of the memory 16 as selected for processing or does not register it. If the feature service 12 registers the stored sensor data for processing, the master feature service 12 provides the information about the registered sensor data for processing to the further feature services 13, 14 (e.g. slave feature service and slave and final feature service) in the corresponding service pipeline 15.

Furthermore, the master feature service 12 of the at least one service pipeline 15 locks the memory location of the memory 16 with the stored sensor data to prevent overwriting of the corresponding sensor data. In addition, the master feature service 12 processes the sensor data from the locked memory location and provide output to further feature services 13, 14 in the corresponding service pipeline 15. If there is a feature service 13 (e.g., slave feature service) present in the service pipeline 15 then this feature service 13 processes the same stored sensor data from the locked memory location for processing and provides output to further feature services 13, 14.

If the feature service is a final feature service 14 (e.g., slave and final feature service) then this feature service 14 processes the same stored sensor data from the locked memory location and provides a final output. In addition, upon completion of processing 29 of the sensor data stored in the memory location by a final feature service 14, the final feature service 14 removes the lock of the corresponding service pipeline 15 from the memory location of the memory 16 via a signal as described above. If there are further locks registered for the memory location from other master feature services 12 of other service pipelines 15 then the memory location remains locked, e.g., sensor system 11 is not able to overwrite the locked memory location with further sensor data. If there are no further locks registered for the memory location then the memory location is unlocked, e.g., able to store further sensor data from the sensor system 11.

Figure 3:
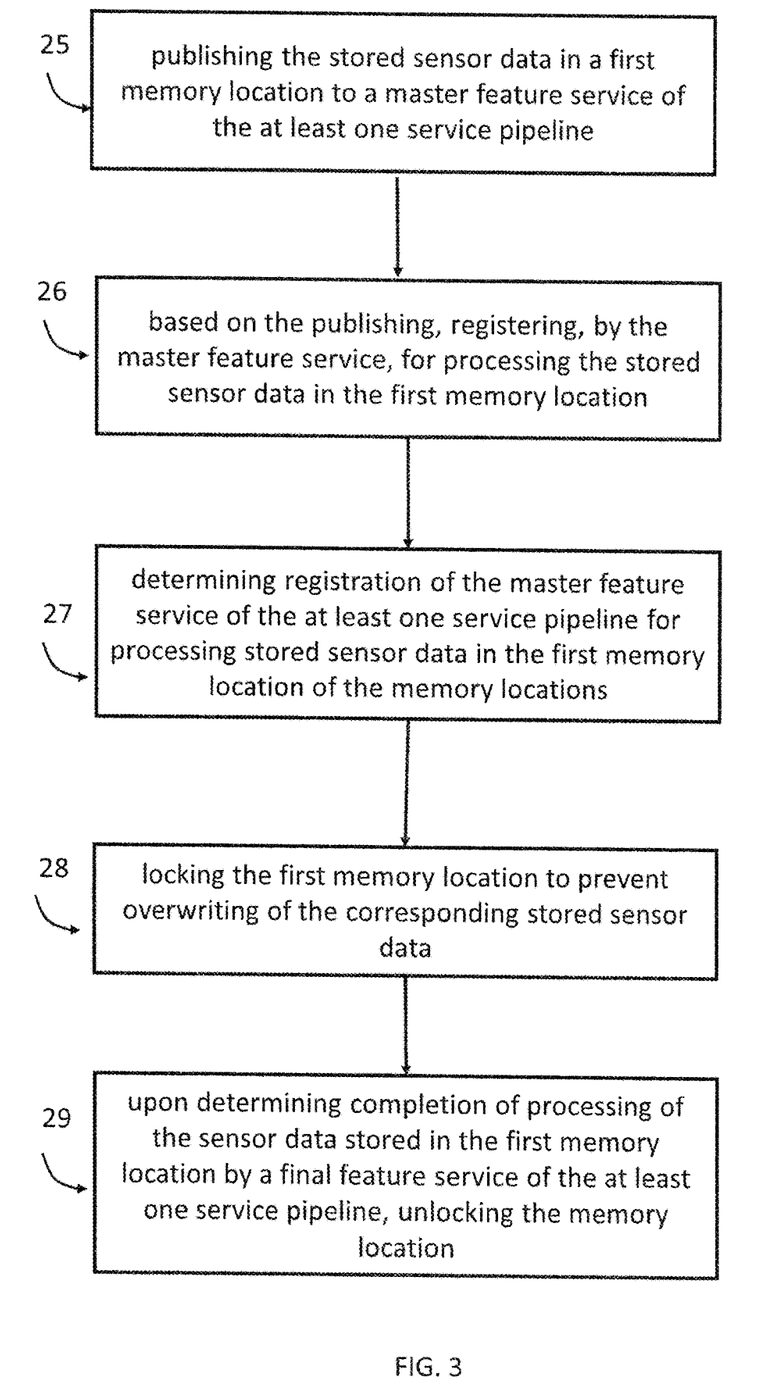
FIG. 3 shows a second sequence for input data management in a data processing system.

FIG. 3 shows a refinement of the method for input data processing system 100. In some embodiments, the controller determines that the stored sensor data in a memory location are published 25 to the master feature service 12 of the at least one service pipeline 15 and based on the publishing 26, the stored sensor data in the first memory location are registered for processing by the master feature service 12.

In a further embodiment, each of the at least one service pipeline 15 comprises a master feature service 12 and a final feature service, the controller determines that a registration of a master feature service 12 of the at least one service pipeline 15 is determined 27 for processing stored sensor data in a first memory location of the memory locations. The controller further determines that the first memory location is locked 28 to prevent overwriting of the corresponding stored sensor data. The controller further determines that upon determining completion of processing 29 of the sensor data stored in the first memory location by a final feature service 14 of the at least one service pipeline 15, the memory location is unlocked.

In a further embodiment of the method, the controller determines that further sensor data are stored to a next unlocked memory location.

After registering the stored sensor data in a memory location for processing, the master feature service(s) 12 of the at least one service pipeline 15 provides the information about the selected sensor data for processing to the other feature services 13, 14 of the at least one service pipeline 15. Therefore, it is guaranteed that all feature services 12, 13, 14 in the corresponding service pipeline 15 process the same sensor data stored in the corresponding memory location. It is also guaranteed that feature services 12, 13, 14 of several service pipelines 15 using sensor data from the same memory location process the same sensor data. It also prevents the at least one sensor system 11 from overwriting sensor data in a used memory location. Furthermore, only sensor data which are registered as selected for processing are stored in the memory 16. A further result is that the overall requirement for storing sensor data is reduced. This input data management ensures that no additional storage of sensor data is required, thus keeping the necessary memory size small. A further advantage is that the sensor data are processed by the service pipelines 15 and their feature services directly in the memory locations of the memory 16. Thus, in the data processing system, no copies of sensor data need to be used. Therefore, efficient memory utilization is facilitated.

Figure 4:
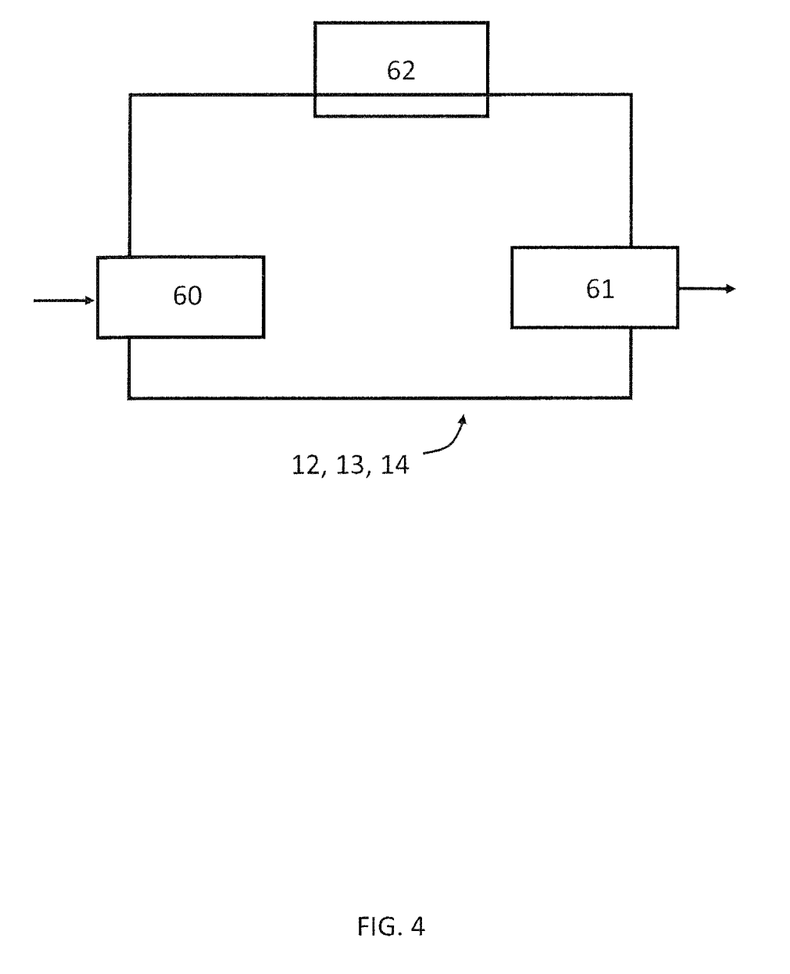
FIG. 4 shows an example of the structure of a feature service.

FIG. 4 shows an example of the internal structure of a feature service 12, 13, 14, which comprises a feature input interface 60, a feature output interface 61 and a configuration file 62. Each feature service 12, 13, 14 is designed to provide one or more features. Each feature is realized by one or more algorithms. These features either provide a final output or an intermediate output serving as input to another feature service, which further process these results and produces further outputs.

Examples of algorithms are data processing algorithms (e.g., face detection, drowsiness, among others) that can be based either on classical or machine learning (AI/ML) methods.

The configuration file 62 specifies parameters that define how the feature service 12, 13, 14 operates. The feature service configuration can be modified without the need of a feature service 12, 13, 14 recompilation, e.g. during runtime. In the configuration file 62 the information about the service pipelines 15 and the perspective roles, master feature service, feature service, (e.g., slave feature service) and final feature service, (e.g., slave and final feature service outputting the processing result of the overall pipeline) of the different feature services 12, 13, 14 is described.

Therefore, it is also possible to reconfigure the roles of the different feature services in the pipeline as master feature service 12, feature service 13 and final feature service 14. The feature service which acts in one pipeline as a master feature service 12, can be used as a final feature service 14 or as feature service 13 in another pipeline.

In an example of a configuration file 62 of a feature service, the configuration file 62 assigns roles of one feature service to three different pipelines 15. In this example, the feature service is part of three pipelines, wherein the names of the different service pipelines 15 are 'pipeline1', 'pipeline2', and 'pipeline3'.

For 'pipeline1', this feature service is the master feature service 12. The master feature service 12 is the feature service which registers further sensor data as selected for processing by all other feature frames belonging to the corresponding service pipeline 15, e.g., 'pipeline1'.

For 'pipeline2' this feature service is configured to be the slave feature service to the 'pipeline2'. The slave feature service 13 processes the sensor data selected by the respective master feature service 12 and provides output for further feature services 13 or the final feature services 14.

Finally, for 'pipeline3' this feature service is the final feature service this means that 'pipeline3' finished processing of the selected input frame and unlocks the memory location of the memory 16 which contains the sensor data for this pipeline 16. When all final feature services 14 of all service pipelines 15 'pipeline1', 'pipeline2', 'pipeline3' finished processing of the selected sensor data, the memory location of the memory 16 is unlocked and able to store further sensor data from the sensor system 11, if no further locks are present for the memory location.

In a further embodiment of the method, each of a plurality of service pipelines 15 comprises a master feature service 12 and a final feature service 14. The controller determines that in response to determining registration of the plurality of master feature services 12 of a plurality of service pipelines 15 for processing sensor data stored in the first memory location, the first memory location is locked to prevent overwriting of the corresponding stored sensor data. The controller further determines that in response to determining completion of processing of the sensor data by all final feature services 14 of the plurality of service pipelines 15, the first memory location is unlocked.

In a further embodiment of the method, the controller determines that in response to determining registration of a plurality of master feature services 12 of the plurality of service pipelines 15 for processing sensor data stored in the first memory location, a lock counter 17 of the first memory location is incremented for each master feature service 14, e.g., the lock counter 17 of the memory location changes the value stepwise from 0 to 42, wherein 42 master feature services 12 have registered for processing sensor data in the memory location and the start value of the lock counter of the unlocked memory location is zero. The controller further determines that in response to determining completion of processing of the sensor data by all final feature services 12 of the plurality of service pipelines 15, the lock counter 17 of the first memory location is decremented for each final feature service (14)., e.g., the lock counter 17 of the memory location changes the value stepwise from 42 to 0, wherein all 42 master feature services 12 completed the processing of the sensor data and the value of the lock counter 17 is zero after all final feature services completed processing.

This ensures that the sensor data in the memory location remains locked (e.g., overwrite protected and the sensor system 11 is not able to overwrite the locked memory location with further sensor data) until the last of the plurality of service pipelines 15 reading the sensor data has also finished its processing. This enables asynchrony between the plurality of service pipelines 15 (i.e. their different processing times due to different algorithms or number of feature services) and ensures that all feature services 12, 13, 14 of the plurality of service pipelines 15 process the same sensor data.

Figure 5:
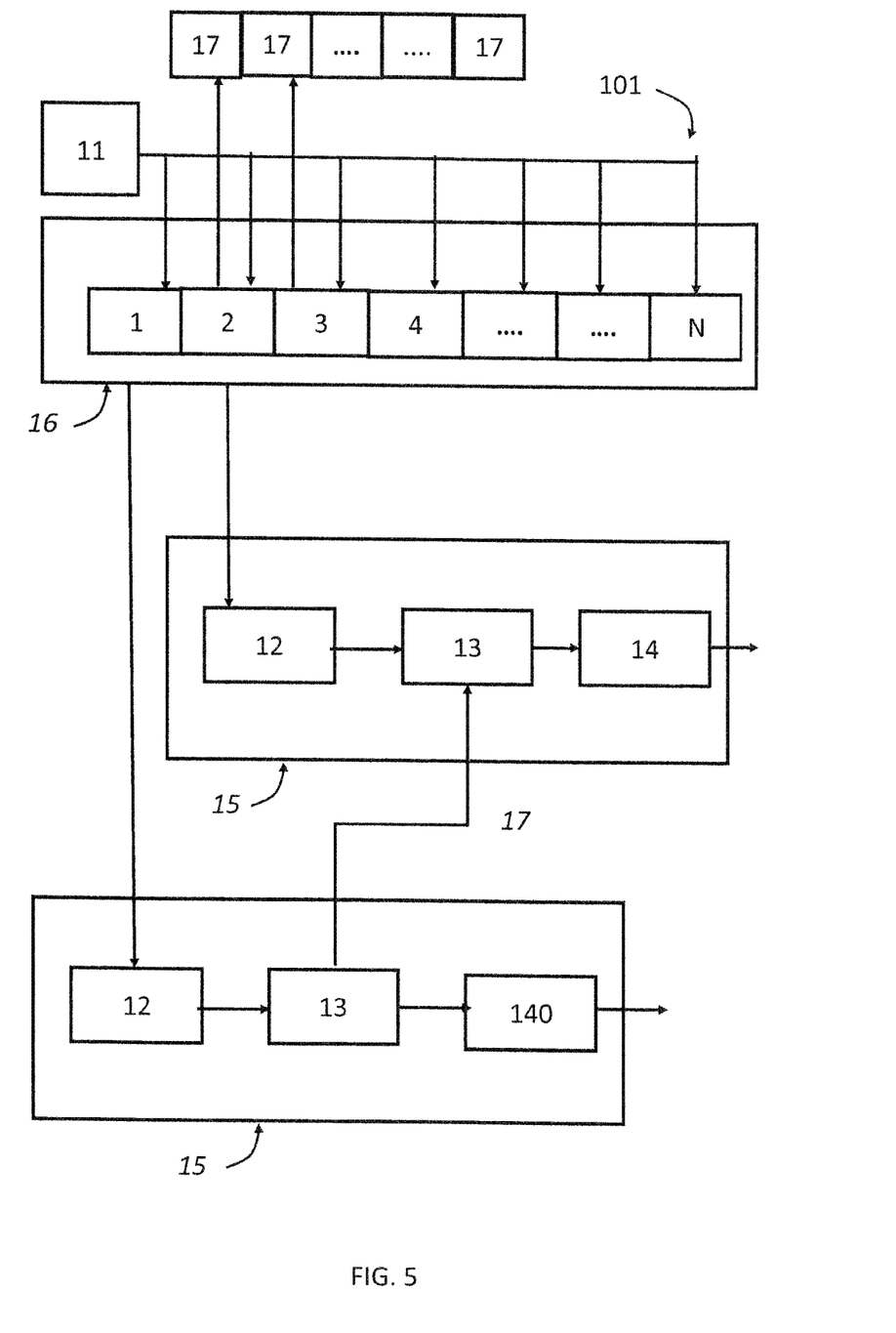
FIG. 5 shows a further example of a data processing system with a sensor system, a memory and a plurality of feature services.

FIG. 5 shows an embodiment of an input data processing system 101, wherein the data processing system 101 comprises a memory 16 comprising a plurality of memory locations, e.g. memory locations 1-, . . . , N in a circular memory. The memory locations are configured to store sensor data obtained from a sensor system 11. In addition, the data processing system 101 comprises at least one service pipeline 15 comprising a plurality of feature services 12, 13, 14 configured to process sensor data stored in the memory locations.

The two-master feature service 12 of the two service pipelines 15 process stored sensor data from the memory locations of the memory 16 and provide outputs for further feature services 13, 14 in the same service pipeline 15 or provide outputs via cross dependencies 17 to feature services of other service pipelines 15.

In a further embodiment of an input data processing system 101, the system 101 comprises a lock counter 17. Each lock counter 17 is connected with a memory location of the memory 16. The lock counter 17 is incremented in response to determining stored sensor data as selected for processing by a master feature service of at least one service pipeline 15 and decremented in response to determining completion of processing of stored sensor data by a final feature service 14 of at least one service pipeline 15.

Figure 6:
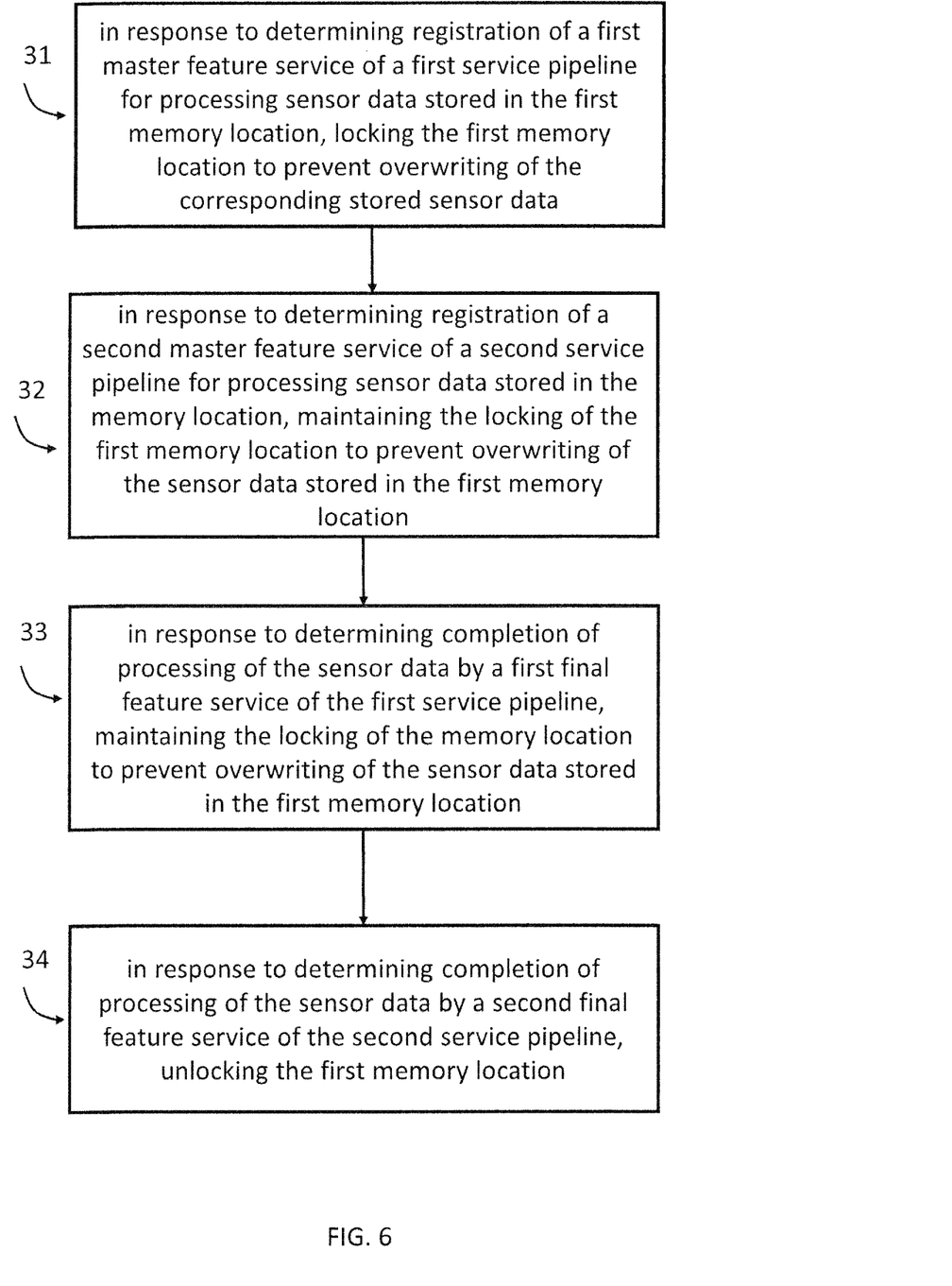
FIG. 6 shows a third sequence for input data management in a data processing system.

FIG. 6 shows schematically a method for an input data processing system 101. In some embodiments, the controller determines that in response to determining registration 31 of a first master feature service 12 of a first service pipeline 15 for processing sensor data stored in the first memory location, the first memory location is locked to prevent overwriting of the corresponding stored sensor data. The controller further determines that in response to determining registration 32 of a second master feature service 12 of a second service pipeline 15 for processing sensor data stored in the memory location, the locking of the first memory location is maintained to prevent overwriting of the sensor data stored in the first memory location. The controller further determines that in response to determining completion of processing 32 of the sensor data by a first final feature service 14 of the first service pipeline 15, the locking of the memory location is maintained to prevent overwriting of the sensor data stored in the first memory location. The controller further determines that in response to determining completion of processing 33 of the sensor data by a second final feature service of the second service pipeline, the first memory location is unlocked.

Figure 7:
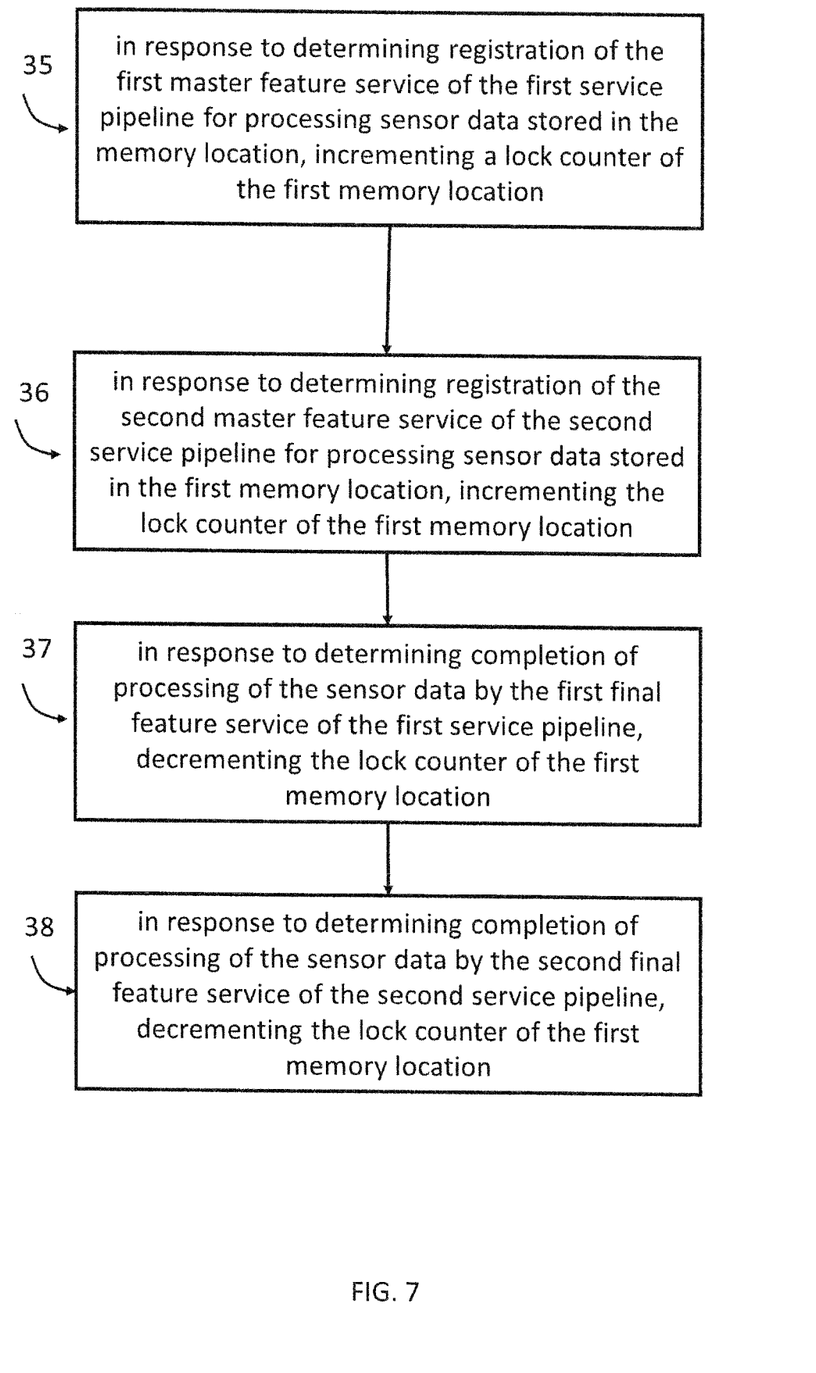
FIG. 7 shows a fourth sequence for input data management in a data processing system.

FIG. 7 shows a further embodiment of the method. In some embodiments, the controller determines that in response to determining registration 35 of the first master feature service 12 of the first service pipeline 15 for processing sensor data stored in the memory location, a lock counter 17 of the first memory location is incremented, e.g., the lock counter 17 of the memory location changes the value from 0 to 1. The controller further determines that, in response to determining registration 36 of the second master feature service 12 of the second service pipeline 15 for processing sensor data stored in the first memory location, the lock counter 17 of the first memory location is incremented, e.g., the lock counter 17 of the memory location changes the value from 1 to 2. The controller further determines that, in response to determining completion of processing 37 of the sensor data by the first final feature service 14 of the first service pipeline 15, the lock counter 17 of the first memory location is decremented, e.g., the lock counter 17 of the memory location changes the value from 2 to 1. The controller further determines that in response to determining completion of processing 38 of the sensor data by the second final feature service 14 of the second service pipeline 15, the lock counter 17 of the first memory location is decremented, e.g., the lock counter of the memory location changes the value from 1 to 0. If the lock counter 17 indicates a value of 0, this corresponds to an unlocked memory location of the memory 16.

In some embodiments, the controller further determines that, the lock counter 17 of the first memory location is stored in the memory 16 or in the sensor system 11. In a further embodiment the lock counter 17 is stored in a controller or a memory controller of the data processing system 101 (not shown), the controller resides either in the sensor system 11, in the memory 16 or as a controller for several sensor systems outside of the data processing system 101.

Figure 8:
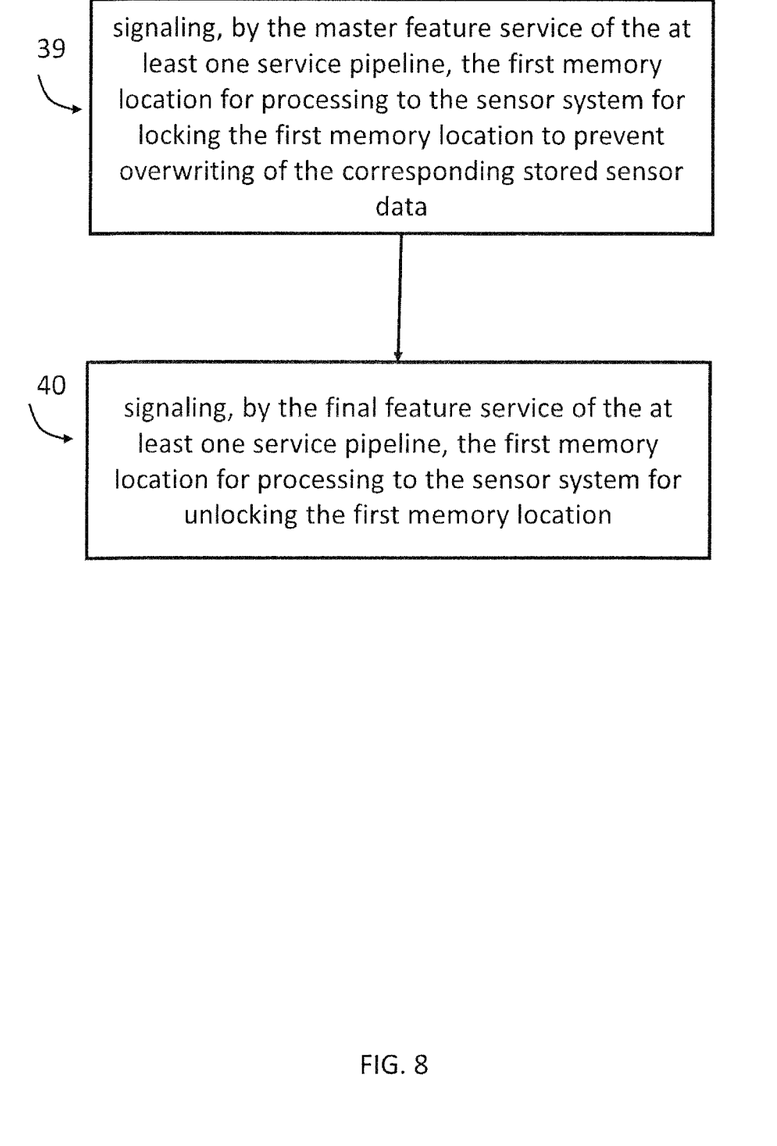
FIG. 8 shows a fifth sequence for input data management in a data processing system.

FIG. 8 shows a further embodiment of the method. In some embodiments, the controller determines that the master feature service 12 of the at least one service pipeline 15 signals to the sensor system 11 that the first memory location for processing is locked to prevent overwriting of the corresponding stored sensor data. The controller further determines that the final feature service 14 of the at least one service pipeline 15 signals to the sensor system 11, that the first memory location for processing is unlocked.

In a further embodiment the method for input data processing system, wherein multiple service pipelines are connected by cross dependencies, wherein two service pipelines share a first feature service and/or a final feature service.

In a further embodiment the method for input data processing system further comprises providing, by the final feature service, an output of the at least one service pipeline to a further processing system.

In a further embodiment the method for input data processing system further comprises processing the same stored sensor data in a memory location by different service pipelines at least in part simultaneously.

In a further embodiment the method for input data processing system further comprises providing an output of a feature service in the service pipeline as input for the next feature service in the service pipeline.

In a further embodiment the method for input data processing system further comprises processing the same stored sensor data in a memory location by different service pipelines at least in part simultaneously.

In a further embodiment the method for input data processing system, wherein the memory is a memory with a given fixed number of memory locations, and the method further comprising the sensor system storing sensor data in a next unlocked memory location of the memory in a circular manner. A circular memory is a memory that uses a single, fixed size buffer as if it were connected end-to-end.

Figure 9:
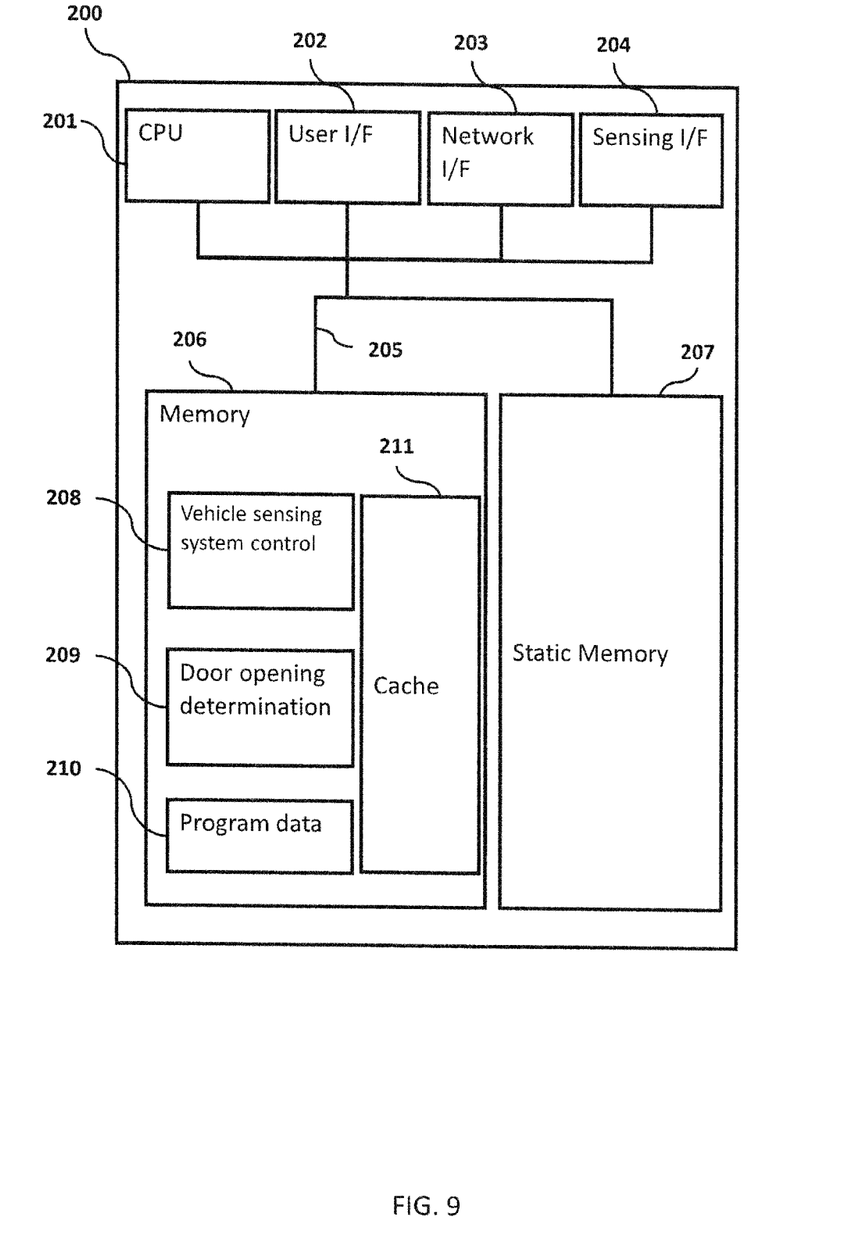
FIG. 9 is a diagrammatic representation of internal components of a data processing system comprises by the system for vehicle exit assistance.

According an aspect, a data processing system for input data management is provided, comprising a memory 16, at least one service pipeline 15 comprising a plurality of feature services 12, 13, 14, the system being configured to perform any one of the computer-implemented methods as described in the preceding paragraphs. FIG. 9 is a diagrammatic representation of internal components of a data processing system 200 implementing the functionality as described herein. The data processing system 200 may be located in the data processing system 100 and includes at least one processor 201, a user interface 202, a network interface 203 and a main memory 206, that communicate with each other via a bus 205. Optionally, the data processing system 200 may further include a static memory 207 and a disk-drive unit (not shown) that also communicate with each other via the bus 205. A video display, an alpha-numeric input device and a cursor control device may be provided as examples of user interface 202.

Furthermore, the data processing system 200 may also comprise a specified sensing interface 204 to communicate with the data processing system 100. Alternatively, the data processing system 200 may communicate with data processing system 100 via the network interface 203. The data processing system 200 may also be connected to database systems (not shown) via the network interface, wherein the database systems store at least part of the images needed for providing the functionalities described herein.

The main memory 206 may be a random-access memory (RAM) and/or any further volatile memory. The main memory 206 may store program code for the data processing system 100. The memory 206 may also store additional program data required for providing the functionalities described herein. Part of the program data 210, the data processing system 100 may also be stored in a separate, e.g., cloud memory and executed at least in part remotely. In such an example embodiment, the memory 206 may store the current occupancy and seat states according to the methods describes herein in a cache 211.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for input data management in a data processing system including a memory with a plurality of memory locations configured to store sensor data obtained from a sensor system and at least one service pipeline with a plurality of feature services configured to process sensor data stored in the plurality of memory locations, the method comprising:
   determining registration of at least one feature service of the plurality of feature services for processing sensor data stored in at least one memory location of the plurality of memory locations;
   locking the at least one memory location to prevent overwriting of the sensor data stored in the at least one memory location;
   upon determining completion of processing of the sensor data by the at least one feature service, unlocking the at least one memory location;
   publishing the sensor data stored in the at least one memory location to the plurality of feature services of the at least one service pipeline;
   based on the publishing, registering the at least one feature service for processing the sensor data stored in at least one memory location;
   determining registration of a master feature service of the at least one service pipeline for processing the sensor data stored in a first memory location of the plurality of memory locations, wherein each of the at least one service pipeline includes a master feature service and a final feature service;
   locking the first memory location to prevent overwriting corresponding stored sensor data;
   upon determining completion of processing of the corresponding stored sensor data, unlocking the first memory location;
   in response to determining registration of a plurality of master feature services of a plurality of service pipelines for processing sensor data stored in the first memory location, locking the first memory location to prevent overwriting of the corresponding stored sensor data, wherein each of the plurality of service pipelines includes a master feature service and a final feature service; and
   in response to determining completion of processing of the sensor data by all final feature services of the plurality of service pipelines, unlocking the first memory location.

2. The method of claim 1 further comprising:
   publishing the stored sensor data in the first memory location to the master feature service of the at least one service pipeline; and
   based on the publishing, registering, by the master feature service, for processing the stored sensor data in the first memory location.

3. The method of claim 1 further comprising storing further sensor data to a next unlocked memory location.

4. The method of claim 1 further comprising:
   in response to determining registration of the plurality of master feature services of the plurality of service pipelines for processing sensor data stored in the first memory location, incrementing a lock counter of the first memory location for each master feature service; and
   in response to determining completion of processing of the sensor data by each final feature service of the plurality of service pipelines, decrementing the lock counter of the first memory location for each final feature service.

5. The method of claim 4 further comprising storing the lock counter of the first memory location in the memory or in the sensor system.

6. The method of claim 5 further comprising:
   signaling, by the master feature service of the at least one service pipeline, the first memory location for processing to the sensor system for locking the first memory location to prevent overwriting of the corresponding stored sensor data; and
   signaling, by the final feature service of the at least one service pipeline, the first memory location for processing to the sensor system for unlocking the first memory location.

7. The method of claim 6 wherein:
   multiple service pipelines are connected by cross dependencies; and
   two service pipelines share at least one of a master feature service or a final feature service.

8. The method of claim 7 further comprising providing, by the final feature service, an output of the at least one service pipeline to a further processing system.

9. The method of claim 8 further comprising processing the stored sensor data in a memory location by different service pipelines at least in part simultaneously.

10. The method of claim 9 wherein:
    the memory is a memory with a given fixed number of memory locations; and
    the method comprises storing, by the sensor system, sensor data in a next unlocked memory location of the memory in a circular manner.

11. A data processing system comprising:
    a memory with a plurality of memory locations configured to store sensor data obtained from a sensor system;
    at least one service pipeline with a plurality of feature services configured to process sensor data stored in the plurality of memory locations; and
    at least one processor configured to execute instructions, wherein the instructions include:
       determining registration of at least one feature service of the plurality of feature services for processing sensor data stored in at least one memory location of the plurality of memory locations,
       locking the at least one memory location to prevent overwriting of the sensor data stored in the at least one memory location,
       upon determining completion of processing of the sensor data by the at least one feature unlocking the at least one memory location,
       publishing the sensor data stored in the at least one memory location to the plurality of feature services of the at least one service pipeline, based on the publishing, registering the at least one feature service for processing the sensor data stored in at least one memory location, determining registration of a master feature service of the at least one service pipeline for processing the sensor data stored in a first memory location of the plurality of memory locations, wherein each of the at least one service pipeline includes a master feature service and a final feature service, locking the first memory location to prevent overwriting corresponding stored sensor data, upon determining completion of processing of the corresponding stored sensor data, unlocking the first memory location, in response to determining registration of a plurality of master feature services of a plurality of service pipelines for processing sensor data stored in the first memory location, locking the first memory location to prevent overwriting of the corresponding stored sensor data, wherein each of the plurality of service pipelines includes a master feature service and a final feature service, and in response to determining completion of processing of the sensor data by all final feature services of the plurality of service pipelines, unlocking the first memory location.

12. A non-transitory computer-readable medium comprising instructions that include:

determining registration of a feature service of a plurality of feature services for processing sensor data stored in at least one memory location of a plurality of memory locations;

locking the at least one memory location to prevent overwriting of the sensor data stored in the at least one memory location;

upon determining completion of processing of the sensor data by the feature service, unlocking the at least one memory location;

publishing the sensor data stored in the at least one memory location to the plurality of feature services of at least one service pipeline;

based on the publishing, registering the feature service for processing the sensor data stored in at least one memory location;

determining registration of a master feature service of the at least one service pipeline for processing the sensor data stored in a first memory location of the plurality of memory locations, wherein each of the at least one service pipeline includes a master feature service and a final feature service;

locking the first memory location to prevent overwriting corresponding stored sensor data;

upon determining completion of processing of the corresponding stored sensor data, unlocking the first memory location;

in response to determining registration of a plurality of master feature services of a plurality of service pipelines for processing sensor data stored in the first memory location, locking the first memory location to prevent overwriting of the corresponding stored sensor data, wherein each of the plurality of service pipelines includes a master feature service and a final feature service; and in response to determining completion of processing of the sensor data by all final feature services of the plurality of service pipelines, unlocking the first memory location.

* * * * *